(No Model.)

A. C. BARLER.
DAMPER FOR STOVE PIPES AND HOT AIR FLUES.

No. 348,947. Patented Sept. 14, 1886.

Witnesses:
W. A. Anderson.
A. H. Orwig.

Inventor:
Augustus C. Barler,
By Thomas G. Orwig, Atty.

UNITED STATES PATENT OFFICE.

AUGUSTUS C. BARLER, OF DES MOINES, IOWA.

DAMPER FOR STOVE-PIPES AND HOT-AIR FLUES.

SPECIFICATION forming part of Letters Patent No. 348,947, dated September 14, 1886.

Application filed December 19, 1885. Serial No. 186,131. (No model.)

*To all whom it may concern:*

Be it known that I, AUGUSTUS C. BARLER, a citizen of the United States of America, and a resident of Des Moines, in the county of Polk and State of Iowa, have invented an Improved Damper for Stove-Pipes and Hot-Air Flues, of which the following is a specification.

My object is to simplify the construction, reduce the cost, facilitate the application, and improve the appearance and efficiency of a damper in stove-pipes.

My invention consists in the combination of a journal, an angular shank and screw-seat, and a detachable tubular handle with a disk and a pipe, as hereinafter set forth, in such a manner that the shank and journal can be passed outward through a perforation in the pipe, the handle slipped over the shank to conceal it, and all the parts clamped together by a single screw, and the pressure regulated as required to support and quietly operate the damper upon a single journal and bearing.

Figure 1:
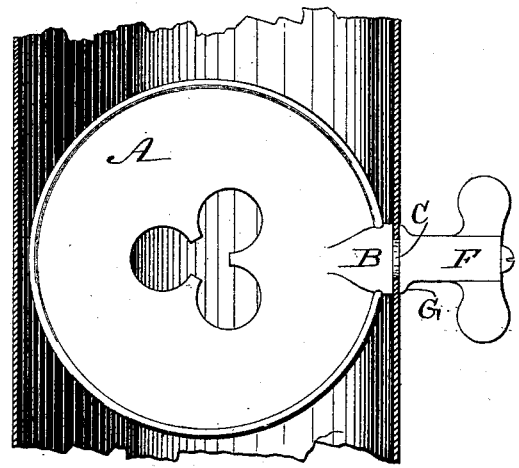
Figure 2:
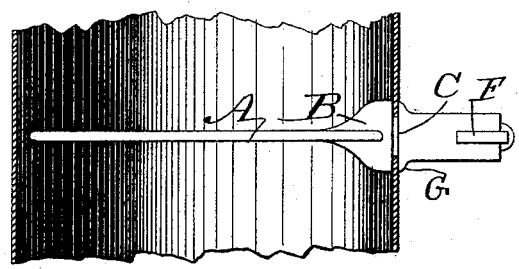
Figure 4:
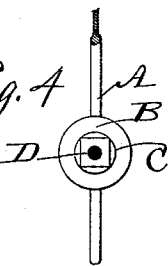
Figure 3:
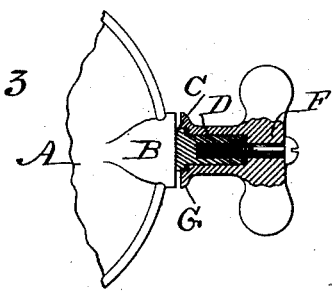

Figure 1 of the accompanying drawings is a vertical half-section of a pipe and the damper combined therewith in an open position. Fig. 2 is a corresponding section of pipe, showing a damper attached and in position as required to close the pipe. Fig. 3 is a sectional view of all the parts that are connected by means of a single screw. Fig. 4 is an end view of the combined journal and tubular shank.

A represents a disk, that may be made of cast or sheet metal of any size desired. It is provided with a central perforation in the shape of a trefoil or other artistic design.

B is the base of my combined journal and shank. It may be cast integral with the disk or terminate in a flat-surfaced and perforated extension adapted to be riveted to a sheet-metal disk.

C is a journal extending horizontally from the center of the cylindrical end of the base B, and formed integral therewith.

D is an angular shank and screw-seat extending horizontally from the center of the end of the journal C, and formed integral with the journal C and base B. This shank has a central screw-threaded bore adapting it to receive and retain a screw, as clearly shown in Fig. 3.

F is a T-shaped cast-metal handle that may vary in ornamentation or design as desired. It has an angular bore that admits the angular shank, and a central circular bore of smaller diameter, that extends from the angular bore outward to admit a screw or bolt.

G is an enlargement at the end of the handle and angular bore, that has a circular bore that will admit the end of the journal C and conceal it, cover the perforation in the pipe, and also engage the outside surface of the pipe to provide the friction required to retain the disk stationary at any angle desired relative to the pipe by the pressure of the screw that is passed through the bore of the handle into the screw-seat in the end of the shank to hold all the parts together. The annular shoulder at the inner end of the base B of the journal C engages the inside surface of the pipe, and the enlarged end of the tubular handle the outside surface, and their pressure and friction are readily regulated by simply turning the screw in its seat as required to retain the disk stationary in its single bearing at any angle desired.

I am aware that a damper has had a single journal extended through a perforation in a pipe, and a collar and a handle attached to the journal in such a manner that the damper could be operated inside of the pipe by means of the handle, and the friction regulated by means of a nut on the end of the journal that extended through the handle; but my combination of a damper having a journal, a tubular handle, and a screw with a pipe is novel and advantageous.

I claim as my invention—

The combination of the disk A, having the enlargement B, journal C, angular shank and screw-seat D, the tubular handle F, having an enlarged end, G, and a pipe, substantially as shown and described, for the purposes stated.

AUGUSTUS C. BARLER.

Witnesses:
R. H. ORWIG,
THOMAS G. ORWIG.